United States Patent
Lafosse

(10) Patent No.: US 12,354,040 B2
(45) Date of Patent: Jul. 8, 2025

(54) REDUCING GREENHOUSE GAS EMISSIONS PER USER BY INCREASING THE NUMBER OF USERS ON A FLIGHT

(71) Applicant: TravelXchange Inc., Miami, FL (US)

(72) Inventor: Juan Pablo Lafosse, Buenos Aires (AR)

(73) Assignee: TravelXchange Inc., Miami, FL (US)

(*) Notice: Subject to any disclaimer, the term of this patent is extended or adjusted under 35 U.S.C. 154(b) by 0 days.

(21) Appl. No.: 18/970,621

(22) Filed: Dec. 5, 2024

(65) Prior Publication Data
US 2025/0190896 A1    Jun. 12, 2025

Related U.S. Application Data

(60) Provisional application No. 63/606,897, filed on Dec. 6, 2023.

(51) Int. Cl.
*G06Q 10/00* (2023.01)
*G06Q 10/0631* (2023.01)
*G06Q 50/00* (2024.01)
*G06Q 50/40* (2024.01)

(52) U.S. Cl.
CPC ....... *G06Q 10/06312* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 2005/0125267 A1 | 6/2005 | Bramnick et al. | |
| 2010/0318385 A1 | 12/2010 | Serra et al. | |
| 2014/0278596 A1 | 9/2014 | Cordero et al. | |
| 2015/0073842 A1* | 3/2015 | Aljabarti | G06Q 10/02 705/5 |
| 2018/0158154 A1 | 6/2018 | Arguello et al. | |

(Continued)

FOREIGN PATENT DOCUMENTS

CN    116029513 A * 4/2023

OTHER PUBLICATIONS

International Search Report and Written Opinion dated Feb. 6, 2025, for related PCT Patent Application PCT/US2024/058706, Feb. 6, 2025.

*Primary Examiner* — Matheus Ribeiro Stivaletti
(74) *Attorney, Agent, or Firm* — Perkins Coie LLP

(57) ABSTRACT

The system obtains multiple attributes associated with a transportation, where the multiple attributes include a time remaining until departure, occupancy associated with the transportation, and an indication of future increase in him occupancy. Based on the multiple attributes, the system categorizes the transportation into multiple clusters. A first cluster is expected to be over full. A second cluster is expected to have the number of users match the number of seats. A third cluster is likely to have the number of users exceed the number of seats. A fourth cluster is expected to be partially empty. Upon categorizing the transportation into the first, second, or third cluster, the system determines the fourth transportation and increases the number of users associated with the fourth transportation by sending a message to a user associated with the transportation including a request to move the user to the fourth transportation.

14 Claims, 10 Drawing Sheets

(56) References Cited

U.S. PATENT DOCUMENTS

| | | | |
|---|---|---|---|
| 2019/0108461 A1* | 4/2019 | Lang | G06Q 10/02 |
| 2019/0378224 A1* | 12/2019 | Krych | G06Q 50/14 |
| 2020/0242858 A1 | 7/2020 | Meroux et al. | |
| 2020/0250604 A1* | 8/2020 | Hildebrand | G06Q 10/06315 |
| 2022/0230108 A1 | 7/2022 | Bollapragada et al. | |
| 2023/0012083 A1 | 1/2023 | Fox et al. | |
| 2023/0214792 A1* | 7/2023 | Lee | G06Q 20/02 |
| | | | 705/75 |

* cited by examiner

REDUCING GREENHOUSE GAS EMISSIONS PER USER BY INCREASING THE NUMBER OF USERS ON A FLIGHT

CROSS-REFERENCE TO RELATED APPLICATIONS

This application claims priority to and benefit of U.S. Provisional Application 63/606,897 filed on Dec. 6, 2023, which is incorporated herein in its entirety by this reference.

BACKGROUND

Flying on flights that are not full is particularly detrimental to greenhouse gas emissions and exacerbates the environmental impact of air travel. When an aircraft operates below its full passenger capacity, it results in a higher per-passenger carbon footprint. The fuel consumption and emissions of an airplane are primarily determined by the aircraft's weight and aerodynamics, which do not significantly decrease with fewer passengers. Consequently, the total emissions of the flight are spread across fewer individuals, increasing the emissions attributable to each passenger. This inefficiency means that the environmental cost of transporting each person is substantially higher on a partially filled flight compared to a full one. Moreover, airlines may continue to operate underbooked flights to maintain schedules and retain airport slots, leading to unnecessary emissions. This practice not only wastes fuel but also contributes disproportionately to aviation's overall carbon footprint. Additionally, airlines may need to operate more flights to accommodate the same number of passengers, further increasing the total emissions.

BRIEF DESCRIPTION OF THE DRAWINGS

Detailed descriptions of implementations of the present invention will be described and explained through the use of the accompanying drawings.

Figure 1:
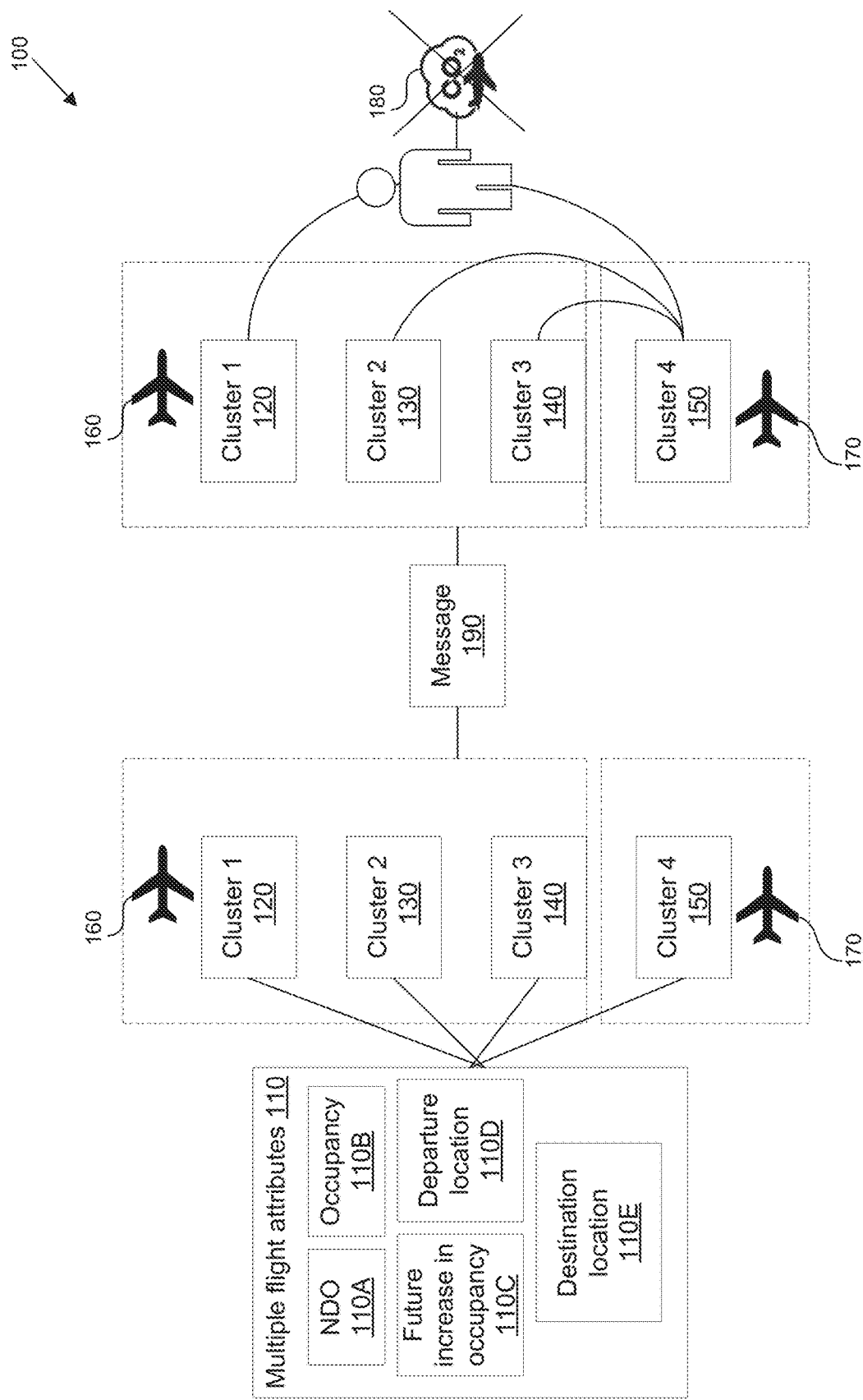
FIG. 1 shows a system to reduce greenhouse emissions per user by increasing the number of users on a flight.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

By improving load factors and ensuring flights operate closer to full capacity, airlines can significantly reduce the per-passenger emissions and enhance the overall efficiency of air travel, thus mitigating its impact on greenhouse gas emissions and thus global warming.

Transcontinental flights typically have 80% to 85% occupancy. An average amount of greenhouse gases emitted per passenger on a transcontinental flight is approximately 1.5 to 2 metric tons of carbon dioxide equivalent. This includes both $CO_2$ and non-$CO_2$ climate effects of aviation, like contrails. For context, this amount of emission is roughly equivalent to the emissions from driving a typical passenger car for 3-4 months or the annual carbon footprint of an average person in many developing countries. Short-haul flights tend to have higher per-mile emissions, while very long international flights can have slightly lower per-mile emissions due to spending more time at efficient cruising altitudes. This significant per-passenger impact highlights why improving flight efficiency and load factors is important for reducing aviation's climate impact. The disclosed system 100, by enabling full occupancy of a flight, reduces carbon emissions by 20%, or 0.3 to 0.4 metric tons per passenger of greenhouse gas emissions.

The disclosed system obtains multiple attributes associated with a flight, including a time remaining until departure, occupancy associated with the flight, an indication of future increase in occupancy, a departure location, and a destination location. Based on the time remaining until departure, the occupancy associated with the flight, and the indication of future increase in occupancy, the system categorizes the flight into a cluster among multiple clusters. A flight belonging to cluster 1 is expected to have a number of passengers exceed a number of seats associated with the flight. A flight belonging to cluster 2 is expected to have the number of passengers match the number of seats associated with the flight. A flight belonging to cluster 3 is likely to have the number of passengers exceed the number of seats associated with the flight. A flight belonging to cluster 4 is expected to have the number of passengers be less than the number of seats associated with the flight. Upon categorizing the flight into cluster 1, cluster 2, or cluster 3, the system determines a new flight having a departure location and a destination location matching the departure and destination location of the flight. The system reduces greenhouse gas emissions per passenger associated with the new flight by increasing the number of passengers associated with the new flight by sending a message to a passenger associated with the flight, where the message includes a request to move the passenger to the new flight.

In addition, the system uses artificial intelligence (AI) to predict whether ticketholders are likely to accept a proposal to relinquish their tickets when flights are potentially over-full. The AI also predicts an incentive the ticketholder is likely to accept for relinquishing the ticket.

This system enables new uses and benefits compared to prior systems for issuing tickets to occupy flights. A flight ticket is generally only good on the airline for which it was purchased. However, an airline can endorse the ticket so that it may be accepted by other airlines. Usually, the ticket is for a specific flight. It is also possible to purchase an "open" ticket, which allows travel on any flight between the destinations listed on the ticket.

The system can also send messages to ticketholders to repurchase a seat of a ticketholder, even without a request to move the ticketholder to a different flight. By repurchasing the seat of the ticketholder unlikely to fly, e.g. a no show, the system frees up those seats to be occupied by a new passenger, contributing to the purpose of operating flight as close to full capacity as possible. The system can determine whether the ticketholder is unlikely to fly by examining the ticketholder's prior history of being a no-show on similar flights.

The system can store profiles for passengers and those profiles can be used to determine the likelihood that a particular passenger would be willing to sell their ticket for an oversold flight. The profiles can be stored at a database that is administered for a particular airline or is part of a service hosted by a third party for multiple airlines. A passenger profile can include flight information that is useful or required to confirm that an individual is entitled to a seat on a flight, and additionally can include secondary information indicative of the behavior of the passenger separate from the flight. The information that is useful or required to confirm the passenger's reservation includes the passenger's name, contact information, the issuing airline, a ticket number, the cities between which the ticket is valid for travel, the flight for which the ticket is valid, baggage allowance, fare, taxes, the "fare basis," an alphabetic or alphanumeric code that identifies the fare, restrictions on changes and refunds, dates for which the ticket is valid, form of payment (which in turn can affect how the ticket can be transferred to another passenger), the exchange rate used to calculate any international parts of the fare and tax, or a "fare construction" or "linear" breakdown showing the total fare.

The additional information about a passenger can include data provided by the passenger to indicate preferences or a degree of willingness to transfer tickets that is determined from data unrelated to the flight information, as described in this application. The degree of willingness to transfer the ticket can be quantified as a score across a numerical range based on a measure of likelihood. For example, on a scale of 0 to 1, a score of 0 can indicate that the passenger is highly unlikely to transfer the ticket, whereas a score of 1 can indicate that the passenger is highly likely to transfer the ticket. A numerical value between 0 and 1 (e.g., 0.25, 0.5, 0.75) corresponds to a degree of the measure of likelihood.

The score can be generated based on data collected about the user from various sources including electronic devices (e.g., smartphone, smart watch) and networking resources (e.g., social media website) that are associated with a passenger. For example, the passenger's smartphone can obtain Global Positioning System (GPS) data indicative of the location of the passenger. The location information can be used to predict whether the passenger would be willing to sell back the ticket based on the distance from the airport, the frequency with which the passenger uses the airport, etc. For example, a passenger who has a ticket for a flight departing from a local airport that is within 5 miles of the passenger's home would be more likely to sell back a ticket compared to another passenger with a ticket for a flight departing from an airport that is not near the passenger's home. Hence, the location information can be determined based on, for example, input from a user that designates a home location or a current location that is inferred from a GPS location of the passenger's smart device. The data collected about the user can include data indicative about the trip such as whether the potential passenger is visiting a location for vacation or to connect with a particular contact. That information can be used to determine whether the potential passenger is more or less likely to sell or transfer their ticket.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

FIG. 1 shows a system to reduce greenhouse emissions per user by increasing the number of users on a flight. The system 100 can obtain multiple attributes 110 associated with a flight 160, where the multiple attributes include time remaining until departure 110A, occupancy 110B associated with the flight, an indication of future increase 110C in occupancy, a departure location 110D and a destination location 110E. Amount of time remaining until departure 110A can be number of days out (NDO), occupancy 110B can be load factor, i.e., a percentage of seats occupied on the flight, while the indication of future increase 110C in occupancy can be the reference curve, as described in this application.

Based on the time remaining until departure 110A, the occupancy 110B associated with the flight, and the indication of future increase 110C in occupancy, the system 100 can categorize the flight 160 into multiple clusters 120, 130, 140, 150, as described in this application. A flight 160 belonging to a first cluster 120 is expected to have a number of users, e.g., passengers, exceed a number of seats associated with the flight. A flight 160 belonging to a second cluster 130 is expected to have the number of users match the number of seats associated with the flight. A flight 160 belonging to a third cluster 140 is likely to have the number of users exceed the number of seats associated with the flight. In other words, the first cluster 120 flights and the second cluster 130 flights are more likely than the third cluster flights to have more users than seats. A flight 170 belonging to the fourth cluster 150 is expected to have the number of users be less than the number of seats associated with the flight.

Upon categorizing the flight 160 into the first cluster 120, the second cluster 130, or the third cluster 140, the system 100 can determine the fourth flight 170 corresponding to the flight 160. For example, the fourth flight 170 can have the same departure and destination location as the flight 160.

The system 100 can reduce greenhouse gas emissions 180 per user, e.g., passenger, by ensuring that each flight 160, 170 is at full or close to full capacity. The disclosed system 100, by enabling full occupancy of a flight, reduces carbon emissions by 20%, or 0.3 to 0.4 metric tons per user of greenhouse gas emissions.

The system 100 can increase the number of users associated with the fourth flight 170 by sending a message 190 to a user associated with the flight 160, where the message includes a request to move the user to the flight 170. The request can also include an incentive to motivate the user to change flights. The system 100 can use a multichannel and multifrequency notification engine. Specifically, the system 100 can alert the user on various channels such as text, email, call, depending, for example, on user preferences. The system 100 can also adjust the frequency of notifications based on user preferences, or based on the time remaining until departure.

In addition, the disclosed system provides an efficient solution to the assignment problem or transportation problem in operations research. Specifically, this scenario closely resembles a multi-dimensional assignment problem or a network flow optimization problem. The problem formulation includes an objective to maximize the total occupancy across all flights, with variables including sets of flights, departure locations, users, flight capacities, and binary decision variables for user assignments. Constraints ensure each user is assigned to at most one flight, flight capacities are not exceeded, and users are only assigned to flights from their departure location. The mathematical representation involves maximizing the sum of user assignments subject to these constraints.

This NP-hard problem, which requires exponential computational time to solve, can be solved efficiently using the disclosed system which leverages heuristic systems, metaheuristics, and network flow systems with additional constraints. The disclosed system reduces the exponential computational time in N to approximately $O(N*\log N)$ time, thus significantly reducing the computational cost.

Further, providing an efficient solution to the assignment problem or transportation problem in operations research is particularly beneficial in the technical field of logistics encompassing the planning, implementation, and control of the flow and storage of goods and related information from the point of origin to the point of consumption.

Specific areas within logistics and supply chain management where these solutions are crucial include transportation network optimization, warehouse management, production scheduling, last-mile delivery optimization, air cargo management, and intermodal freight transport. Transportation network optimization involves efficiently routing vehicles, cargo, or personnel across multiple locations to minimize costs and maximize resource utilization. Warehouse management focuses on optimizing the assignment of storage locations for inventory items to minimize picking times and improve overall warehouse efficiency. Production scheduling allocates tasks to machines or workers in manufacturing environments to maximize productivity and minimize idle time. Last-mile delivery optimization assigns delivery routes and packages to drivers in e-commerce and parcel delivery services to reduce delivery times and costs. Air cargo management optimizes the loading of cargo onto aircraft to maximize capacity utilization while adhering to weight and balance constraints. Intermodal freight transport efficiently coordinates the movement of goods across different transportation modes, such as truck, rail, and ship, to reduce costs and transit times.

In the above applications, efficient solutions to assignment and transportation problems can lead to improved resource utilization such as fuel utilization. The ability to quickly solve large-scale instances of these problems is particularly valuable in dynamic environments where conditions change rapidly and decisions must be made in near real-time.

Figure 2:
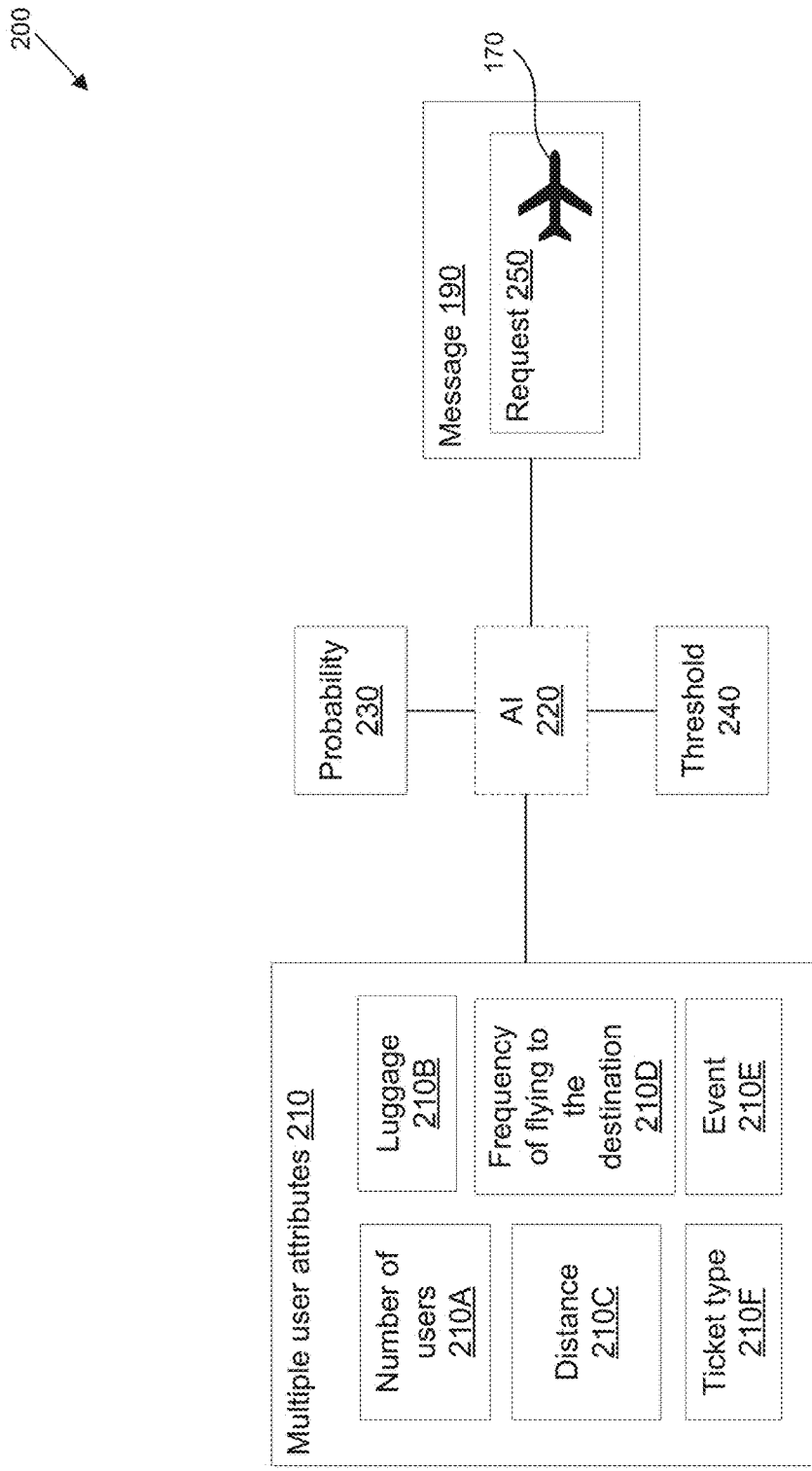
FIG. 2 shows a system to determine the user associated with the flight to whom to send the message.

FIG. 2 shows a system to determine the user associated with the flight to whom to send the message. The system 200 can obtain multiple attributes 210 associated with the user, where the multiple attributes indicate the degree of willingness of the user to change flights. The multiple attributes can include the number of users 210A traveling with the user, whether the user has luggage 210B, a distance 210C between the departure location and a home location associated with the user, the amount of time between the purchase date and the flight's departure date, a frequency 210D of flying to the destination location associated with the user, and/or an indication of an event 210E occurring at the destination location, and the ticket type 210F such as whether the ticket is a one-way ticket or a round-trip ticket.

Based on the multiple attributes 210, the system 200 can determine an indication of probability 230 that the user moves to the flight 170. The system 200 can use an artificial intelligence (AI) 220 to determine the indication of probability 230, or the system can use deterministic programming techniques.

In either case, upon determining that the number of users 210A traveling with the user is low and that the user does not have luggage, the system 200 can decrease the indication of probability 230 that the user moves to the flight 170. For example, the system 200 can set the indication of probability 230 to 0.

Upon determining that the distance between the departure location and the home location associated with the user is above a first predetermined threshold, such as 5 miles, the system 200 can decrease the indication of probability 230 that the user moves to the flight 170. In other words, if the user is at home, the user is more likely to be willing to change the flight, however, if the user is flying home, the user is less likely to change the flight.

Upon determining that the frequency of flying to the destination location associated with the user is above a second predetermined threshold, and that the event occurring at the destination location is occurring during the user's stay at the destination location, the system 200 can increase the indication of probability that the user moves to the flight 170. For example, if there is an event available to the public occurring at the destination location, such as a concert, or an eclipse, the number of people wanting to go to the destination location can increase. If the user frequently goes to the destination location, the system 200 can conclude that the user is going to the destination location independent of the event occurring and is more likely to be willing to change the tickets at a time when there is high demand for the tickets.

The system 200 can determine whether the indication of probability 230 that the user moves to the flight 170 is above a third predetermined threshold 240, such as 0.5. Upon determining that the indication of probability that the user moves to the flight 170 is above the third predetermined threshold, the system 200 can send the message 190, along with the request 250, to the user associated with the flight 160. The request 250 can include an incentive, as described in this application, to move the user to the flight 170.

Figure 3:
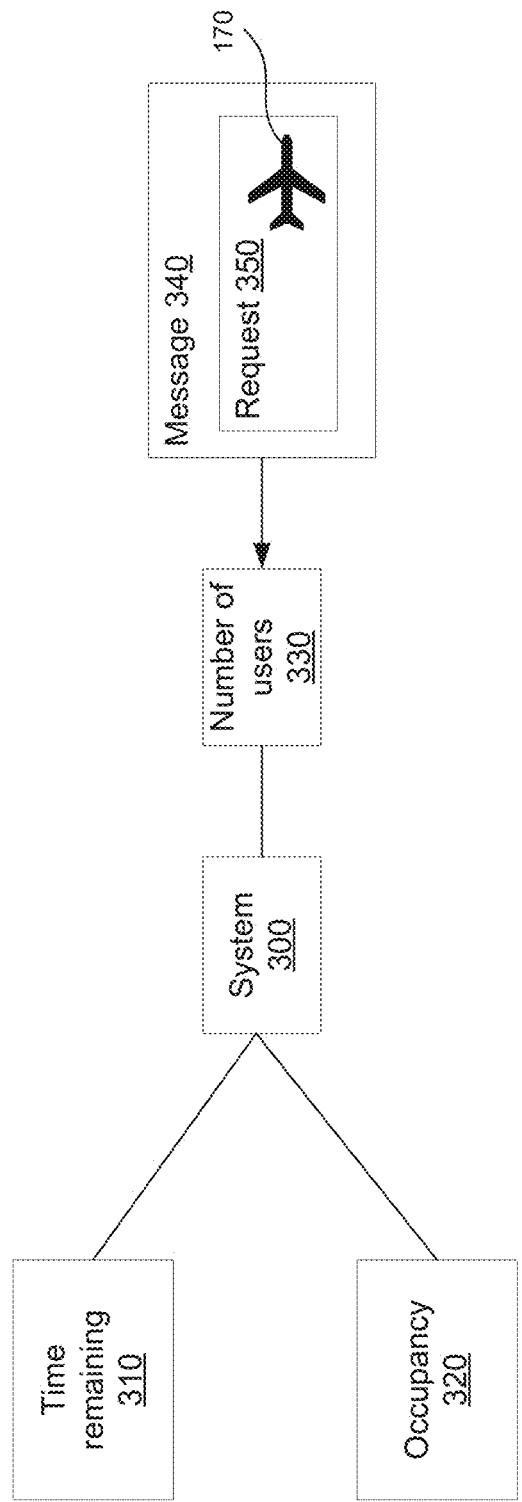
FIG. 3 shows a system to determine a number of messages to send.

FIG. 3 shows a system to determine a number of messages to send. The system 300 can obtain the time remaining 310, e.g., NDO, until departure and the occupancy 320 associated with the flight 160 in FIG. 1. The occupancy 320 can be associated with the categorization of flight 160 into clusters 120, 130, 140, 150 in FIG. 1. For example, cluster 120 has higher occupancy than cluster 130, which is higher occupancy than cluster 140, which in turn has higher occupancy than cluster 150.

Based on the time remaining 310 until departure and the occupancy 320 associated with the flight 160, the system 300 can determine a second number of users 330 to whom to send a message 340 including a request 350 to move to the flight 170 in FIG. 1.

Generally, the higher the occupancy 320 of the flight 160 in FIG. 1, the higher the number of users 330 to whom to send the message 340. However, the number of users 330 varies with the time remaining 310. For example, the higher the occupancy 320 of the flight 160, the higher the number of users 330 up until a point in time, such as ten days before the flight 160. After the point in time, the system 300 decreases the number of users 330 to whom to send a message 340 because the closer to departure, the harder it is to find new flights for the users who agree to change the flight.

Typical parameter ranges for the timing and frequency of messages are as follows. Incentive timing can range from 90 days before departure to the same day of departure. The frequency of notifications varies based on the user archetype and the specific opportunity identified by the system. On average, each Passenger Name Record (PNR) receives 1.6 incentive notifications, with 90% of PNRs receiving two or fewer notifications. These parameters are dynamically adjusted to optimize user engagement and maximize the likelihood of acceptance, ensuring a balance between timely communication and minimizing user fatigue FIGS. 4-7 show various historical data used to determine expected number of passengers on a flight. The disclosed system can obtain historical data represented by the reference curves 400, 500, 600, 700 associated with multiple flights similar to the flight 160 in FIG. 1. The multiple flights represented by the reference curves 400, 500, 600, 700 have a matching destination location and a matching departure location as the flight, and where a time of year associated with the multiple flights matches a time of year associated with the flight. In addition, the multiple flights similar to the flight 160 have had the desired occupancy at flight time. The historical data can include occupancy associated with the multiple flights over time prior to departure of the fifth flight. Specifically, the reference curves 400, 500, 600, 700 on the Y-axis 410, 510, 610, 710 represents the occupancy, while on the X-axis 420, 520, 620, 720 represents NDO, or time remaining until departure and.

Based on the occupancy associated with the multiple flights over time prior to departure, the system can determine the indication 430, 530, 630, 730 of future increase in occupancy associated with the flight. The indication 430, 530, 630, 730 of future increase in occupancy associated with the flight helps the system to classify the flights into Cluster 1, Cluster 2, Cluster 3, and Cluster 4, as described in FIG. 1. The system can define based on cluster the following attributes: quantity to repurchase, expected value, and the proposal. The quantity to repurchase can be the number of users to whom to send the message, as described in this application.

Figure 4:
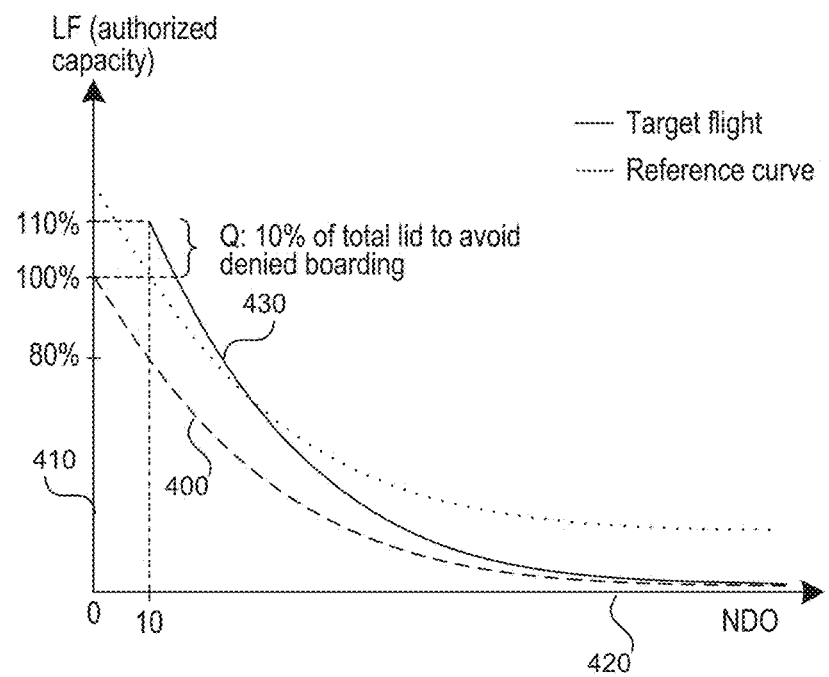
FIG. 4 illustrates a curve that represents flights with booking above their maximum capacity that belong to Cluster 1.
Figure 5:
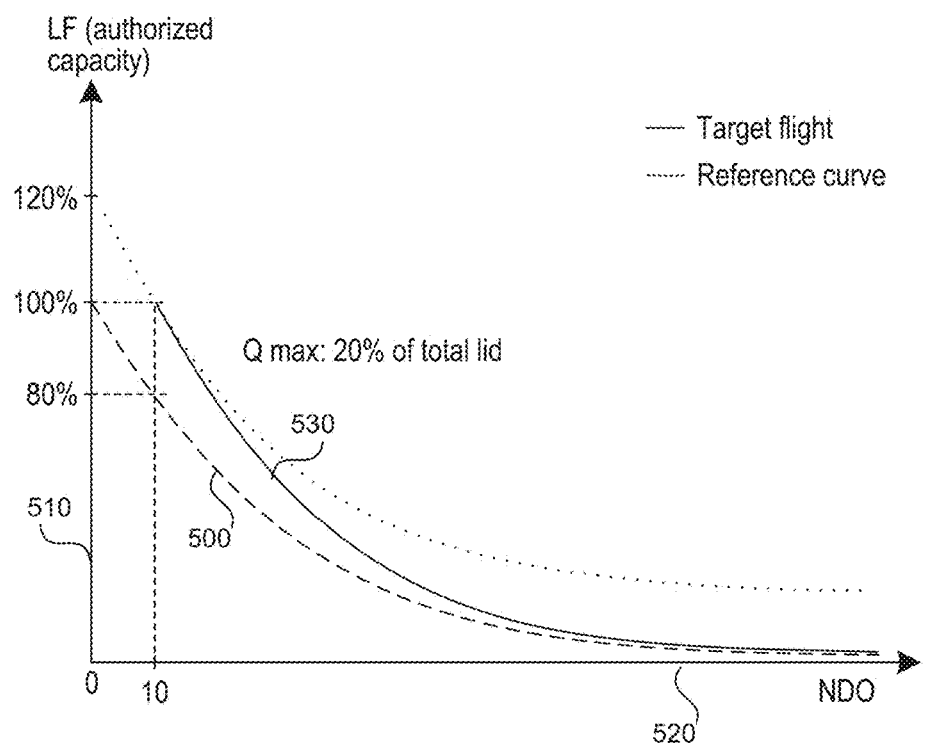
FIG. 5 illustrates a curve that represents fully booked flights that belong to Cluster 2.
Figure 6:
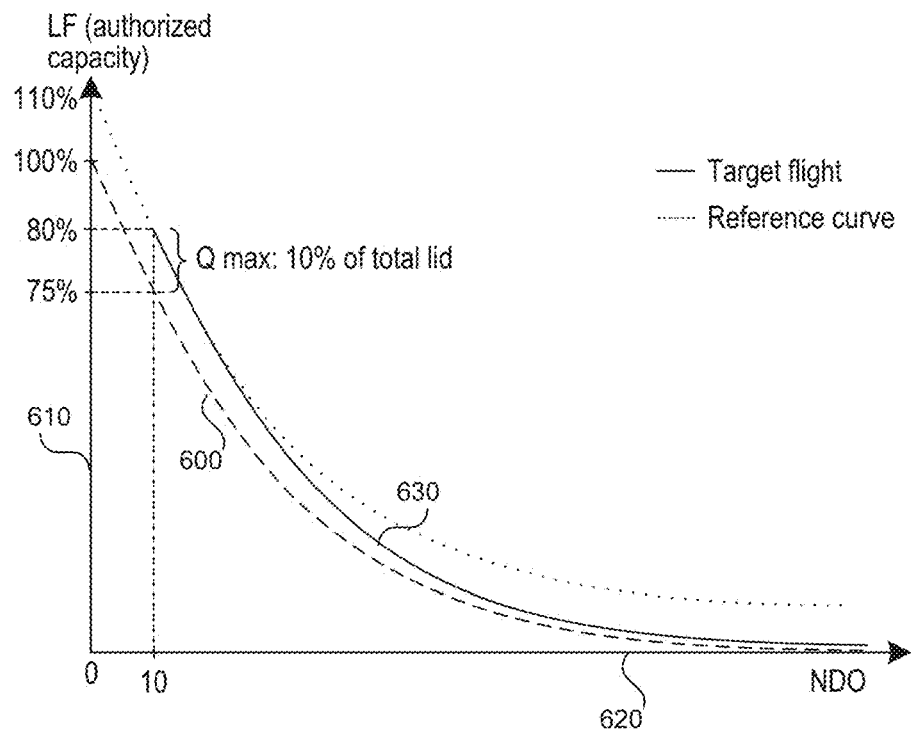
FIG. 6 illustrates a curve that represents flights in Cluster 3 that are likely to have the number of passengers exceed the number of seats.
Figure 7:
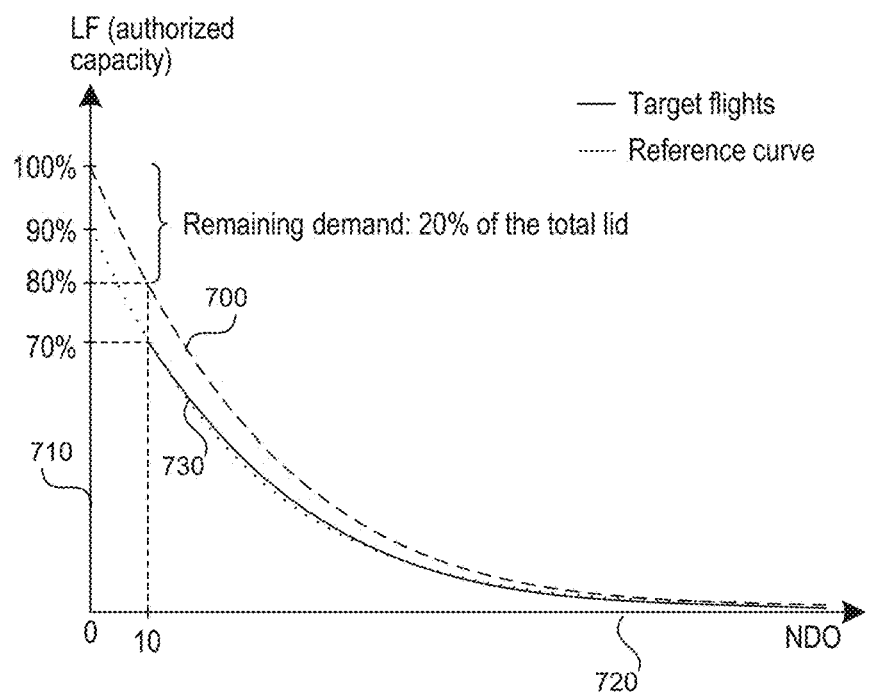
FIG. 7 illustrates a curve that represents flights that are expected to have the number of users be less than the number of seats associated with the flight.

FIG. 4 illustrates a curve 430 that represents flights with bookings above their maximum capacity that belong to Cluster 1. FIG. 5 illustrates a curve 530 that represents fully booked flights that belong to Cluster 2. FIG. 6 illustrates a curve that represents flights in Cluster 3 that are likely to have the number of passengers exceed the number of seats in. FIG. 7 illustrates a curve 730 that represents flights that are expected to have the number of users be less than the number of seats associated with the flight.

Flight Proposal

The following describes the steps that the disclosed system performs to match users to proposals regarding seats available on flights that are partially empty.

Global variables:
a. referenceCurve 400, 500, 600, 700. Reference curve models the relationship between load factor and NDO, that is, what is the estimated flight occupancy based on the days remaining until the flight departure.
b. realCurve 430, 530, 630, 730. Real curve of the relationship between load factor and NDO, taking as data the real sales information.
c. NDO (number of days out). Number of days left until flight departure.
d. loadFactor. Occupancy percentage of a plane.
e. totalLid. Number of seats authorized for sale.
f. TODAY. Day the system is running.
g. ROI. Minimum profit desired on a flight, knowing that buying flights has a risk of not being able to sell them.

Functions:
a. LF({curve}, {NDO}). Gets the load factor of the given curve for the given NDO.

Steps:
1. Obtain information processed by the airline's RM team, which is to be used in the different calculations. Among the information obtained is, for each flight:
   a. Reference curve.
   b. Fare classes.
   c. Current seats sold.
   d. Total lid.
   e. Load factor.
2. Obtain the projected reference curve (reference curve).
3. Obtain the real flight curve (realCurve).
4. Obtain the real load factor with NDO today.

realLfToday=LF(realCurve, TODAY).

5. Obtain the estimated load factor from the reference curve with NDO today.

estimatedLfToday=LF(referenceCurve, TODAY).

6. Obtain the estimated load factor from the reference curve with NDO 0, that is, the projection that the airline made about the final occupancy of that flight.

estimatedLf0=LF(referenceCurve, 0).

7. Calculate the difference between the actual and estimated load factors to date.

LfTodayDiff=realLfToday-estimatedLfToday.

8. Project the difference to the original reference curve to obtain the projected load factor value that the flight would have at departure (projectedLf0).

9. From this projection, classify the flight into the corresponding cluster (Cluster 1, Cluster 2, Cluster 3, or Cluster 4).

10. Once the flight has been classified, proceed to calculate two variables: how many seats to buy and the minimum profit desired on each seat.

11. Logic of seats to buy:
   A. The difference in the load factor with NDO 0 between the projected curve and a load factor of 100% is calculated to understand the percentage of surplus sales that the flight has.

projectedLfDiff0=projectedLf0-100.

B. The total number of seats to be purchased (tsp) is obtained by multiplying the projected difference by the totalLid.

tsp=projectedLfDiff0*totalLid.

12. Minimum profit:
A. Obtain the desired ROI on that flight.
B. Obtain the current fare that is being charged on the flight (currentFare).

C. Calculate the minimum profit that the airline desires on that flight as minProfit=currentFare*ROI 13. Return the flight proposal=currentFare-minProfit.

User Proposal

The following describes the steps that the disclosed system performs to determine how many and to which user to send the notifications.

Variables:
a. Pickup. The number of seats sold per day taken based on the projection of the reference curve.

1. diffPercentage=LF(referenceCurve, {N})-LF(referenceCurve, {N-1})

2. pickup=diffPercentage*totalLid.

Steps:
1. The maximum number of seats to be purchased on that plane (qMax) is defined as qMax=tsp.

2. The daily number of seats to be purchased (qDaily) is defined as the minimum between what is sold per day and the maximum number of seats to be purchased.

qDaily=min(pickup, qMax)

3. The value paid by the user for their ticket (userValuePaid) is obtained.
4. On this paid value, a formula is applied to estimate an incentive that makes a proposal attractive for that user to sell their ticket.

projectedProposal=formula(userValuePaid)

5. The minimum between the projected proposal and the calculated proposal for the flight is taken as the proposal to the user.

userProposal=min(flight proposal, projectedProposal)

6. As users accept proposals, qDaily decreases. Then, when returning the proposal to the user, it is validated if there are still seats available to buy. If there are, the calculated proposal is returned, otherwise the minimum value for that flight based on cost calculations is returned.

userProposal=if(qDaily>0) then userProposal else minProposal.

The system determines potential users to notify based on the attractiveness of the proposal and the respective expected conversion rate. With the potential users, calculated Q daily, notification parameters defined by the airlines (number of notifications per user, maximum frequency, etc.), and the feedback regarding the achieved results, the system defines an incentive strategy (who, what is being proposed, when, and how to notify).

Figure 8:
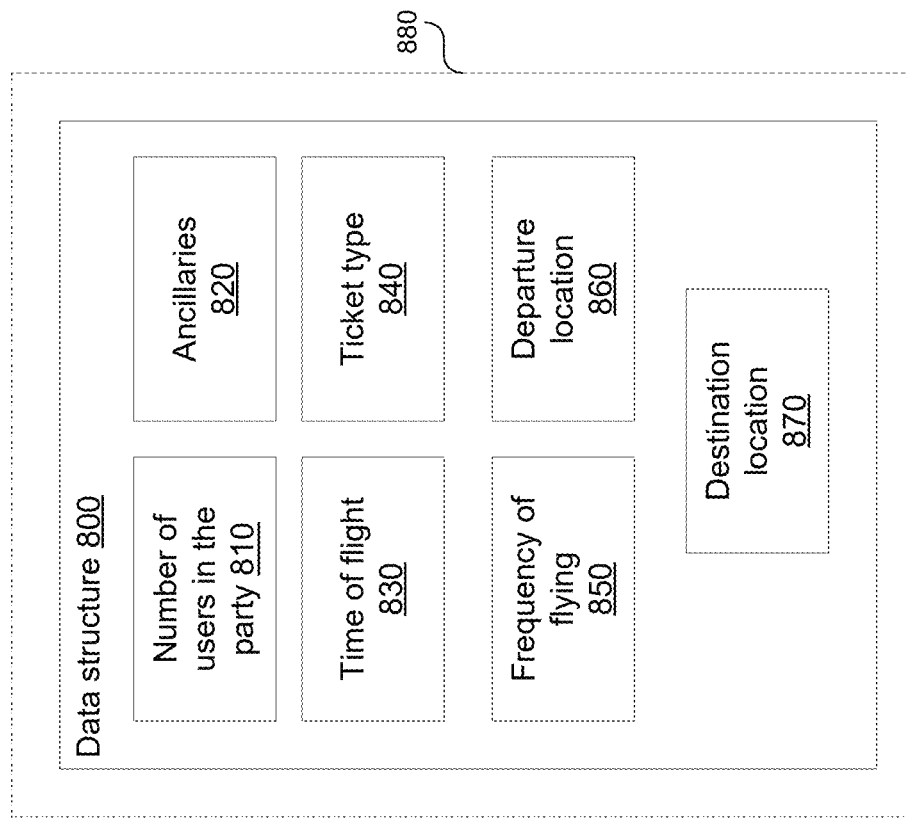
FIG. 8 shows a data structure representing an airline ticket.

FIG. 8 shows a data structure 800 representing an airline ticket. The data structure 800 can include fields 810, 820, 830, 840, 850 that are relevant to the system described in this application. The fields 810, 820, 830, 840, 850 can enable the system to more effectively manage users to flights.

Specifically, the data structure 800 can include field 810 indicating number of users in the party, field 820 indicating ancillaries such as luggage or wheelchair, field 830 indicating time of flight, field 840 indicating ticket type, field 850 indicating a frequency of flying to the destination location associated with the user, field 860 indicating a departure location and field 870 indicating a destination location.

The disclosed system can tokenize the data structure 800 into a digital ticket 880, such as an NFT. The digital ticket 880 can expand the capabilities of a normal ticket, where:
a. Digital tickets can be exchanged between users and airlines.
b. Every time a digital ticket is exchanged, airlines collect new incremental revenues.
c. Digital tickets enable users to exchange their tickets, which increases flexibility.

The creation of the digital ticket is carried out through a tokenization process (see, e.g., PCT Application No. PCT/US23/27820 entitled "BLOCKCHAIN-BASED INTEGRATED SYSTEM FOR TRAVEL PRODUCTS AND SERVICES" filed on Jul. 14, 2023), in which an NFT-based ticket is generated from an airline ticket.

The transformation of an airline ticket into a digital ticket 880 evolves transforming an airline static ticket into a dynamic ticket. This new concept of dynamic ticket unlocks new use cases that represent different ways that the tickets can be exchanged, for example:
a. Ticket buyback: This use case helps airlines increase load factors or occupancy, while simultaneously improving user experience. In this use case, the airline repurchases tickets from users who paid a lower fare to sell the tickets again to new users who are willing to pay more for the same inventory and get an upside from this transaction.
b. Switch and compensate: This use case helps airlines increase load factors or occupancy, while simultaneously improving user experience. In this use case, the airlines proposal gives users who bought airline tickets on specific flights at a lower fare the option to be moved to other flights with empty seats in exchange for compensation, in order to sell that inventory again to new users who are willing to pay more and get an upside from this transaction.
c. Peer to peer (P2P) transfer: This use case allows a user to transfer their ticket to another user (see, e.g., PCT Application No. PCT/US23/27820).
d. P2P marketplace: This use case allows a user to sell their ticket to another user via an intermediary (see, e.g., PCT Application No. PCT/US23/27820).

The transfer P2P use case allows a user to transfer their ticket to a new user, ceding ownership of the ticket. Therefore, users gain a flexibility that they have never had in case of any changes in plans. In this case, the dynamic proposal represents the original value of the digital ticket. The incentive to be paid for the transfer is defined by the airline and the system, as a percentage of the dynamic proposal.

Upon integration with the disclosed system, the airline can tokenize every flight ticket available in the integrated inventory into an NFT.

In order to interact with the P2P solution and the NFT, the user is first registered in the system by creating a user name which is granted a digital wallet.

In the event that the NFT holder decides to make a transfer, the NFT holder can indicate the recipient by completing such recipient's email, in any event up to 6 hours prior to the departure date of the relevant flight represented by the NFT. The recipient must have a valid digital wallet in the system to be able to receive the NFT. The recipient receives an e-mail from the airline indicating that the NFT holder is transferring the NFT. To complete the acceptance of the transfer, the recipient provides all data related to the users of the NFT being transferred.

The P2P marketplace use case allows a user to sell their ticket to a new user, with the airline as an intermediary. In this case, the dynamic proposal represents the incentive for which the owner of the asset puts the ticket up for sale.

Proposal in full flights: A user makes a proposal to buy a seat on a full flight and a new user is willing to sell its seat. The new user buys the seat from the original user with the airline as intermediary.

As P2P transfer, to interact with the P2P dynamic ticket solution and the NFT, the user first registers with the system by creating a user name that is granted a digital wallet.

To transfer the ticket, the user shall place a selling order into the P2P marketplace that intends to transfer the NFT, specifying the selling incentive. Once any resale purchaser places a purchase order against such selling order, the resale purchaser pays the selling incentive to the NFT seller's account. Once the incentive is credited into the NFT seller's account, the system (i) instructs the NFT seller to transfer the NFT directly to the resale purchaser, and (ii) executes such transfer of the NFT from the NFT seller's digital wallet to the resale purchaser's digital wallet.

Figure 9A:
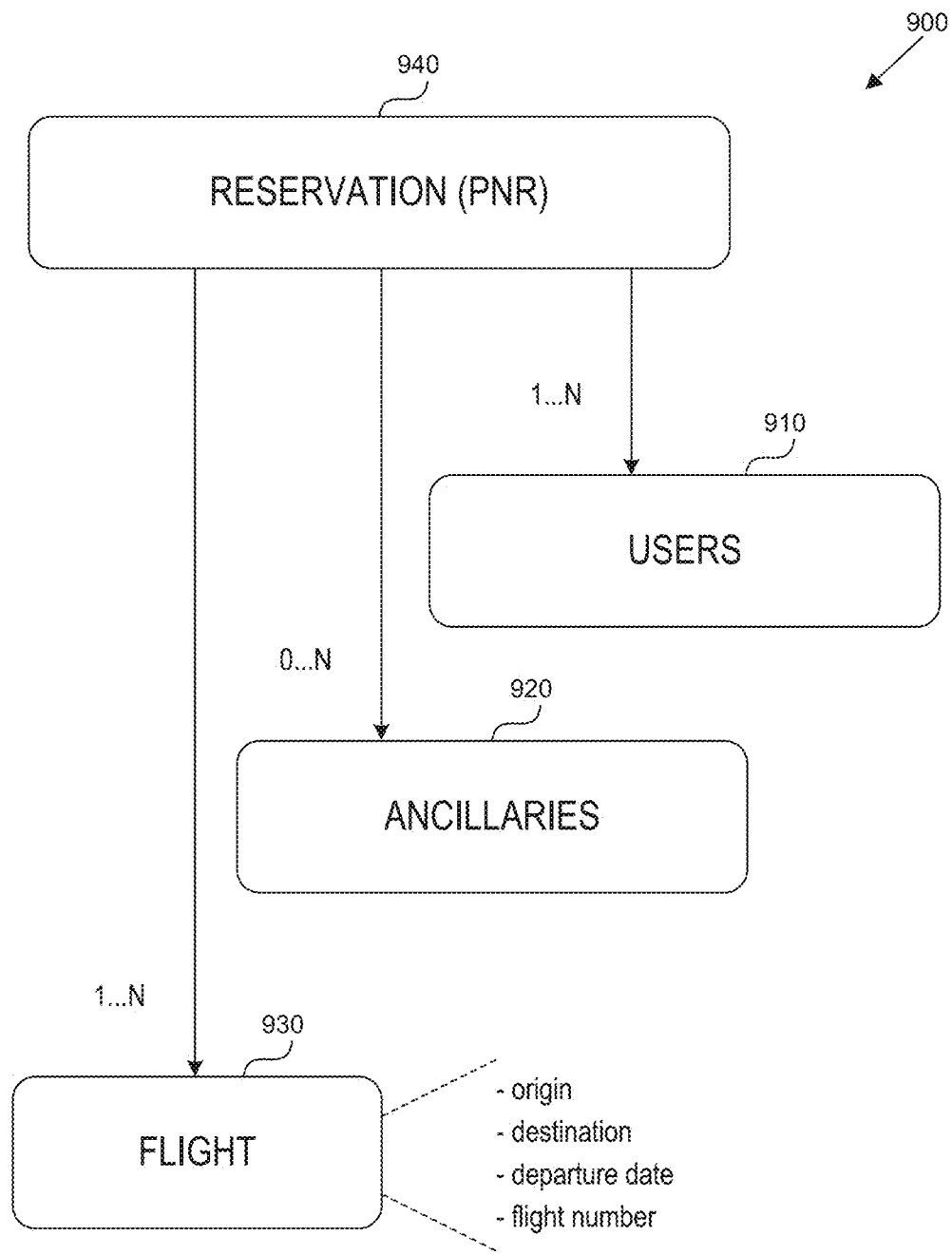
FIGS. 9A-9B show a data structure representing a flight.
Figure 9B:
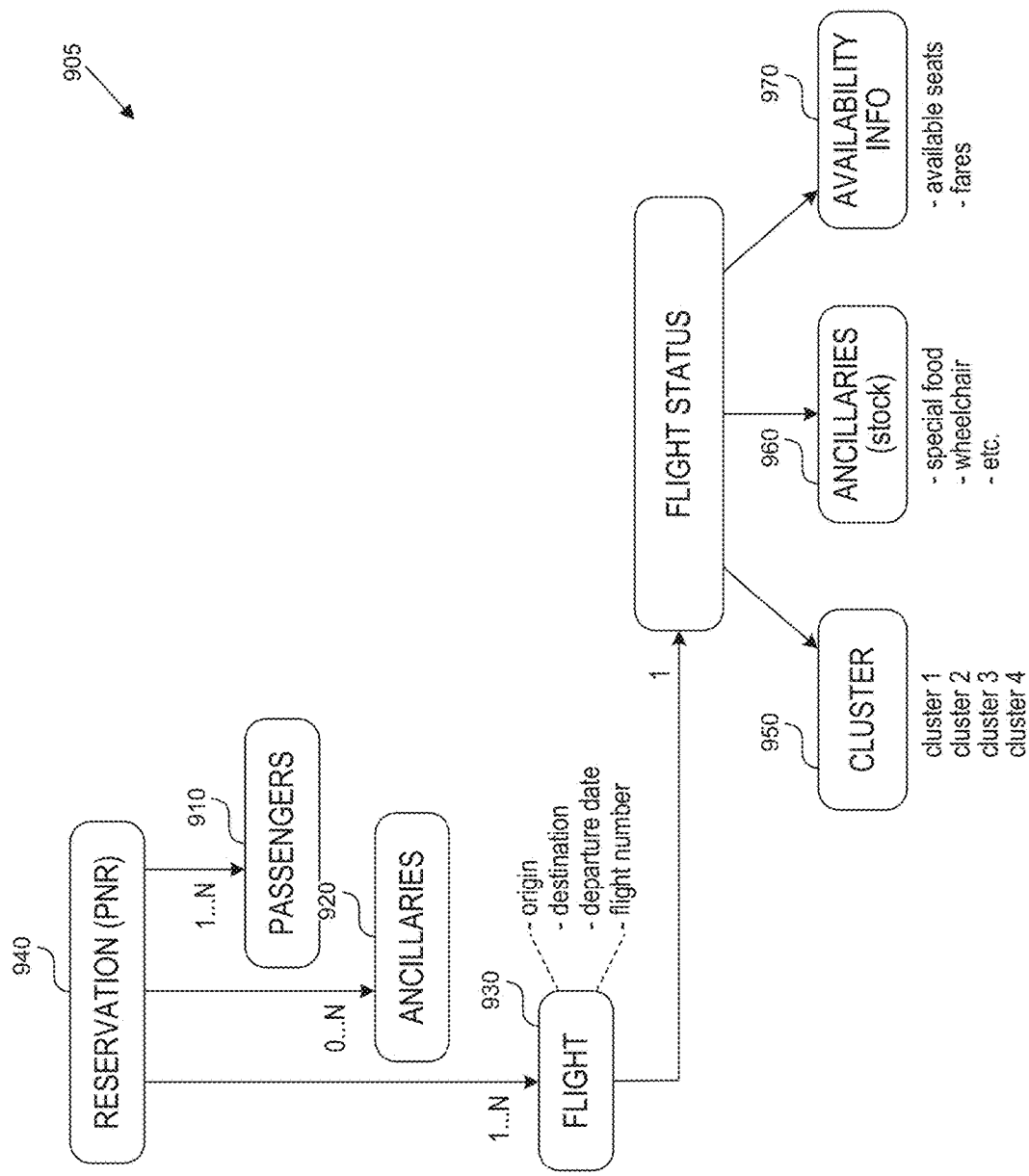

FIGS. 9A-9B show a data structure representing a flight. The data structure 900, 905 includes the following fields: users 910, ancillaries 920, and flight segments 930 (e.g., one-way, round trip, or multiple destinations). Each reservation is identified by a PNR 940 (passenger name record). PNR 940 can be represented by the data structure 800 in FIG. 8.

As reservations are added to a plane and it fills up, the data structure 900 changes its configuration status, where the following information may vary:

a. Cluster (our classification) 950.
b. Stock of ancillaries 960.
c. Availability (available seats and fares) 970.

FIG. 9B illustrates a data structure variation 905 as reservations are added to a plane and it fills up.

Figure 10:
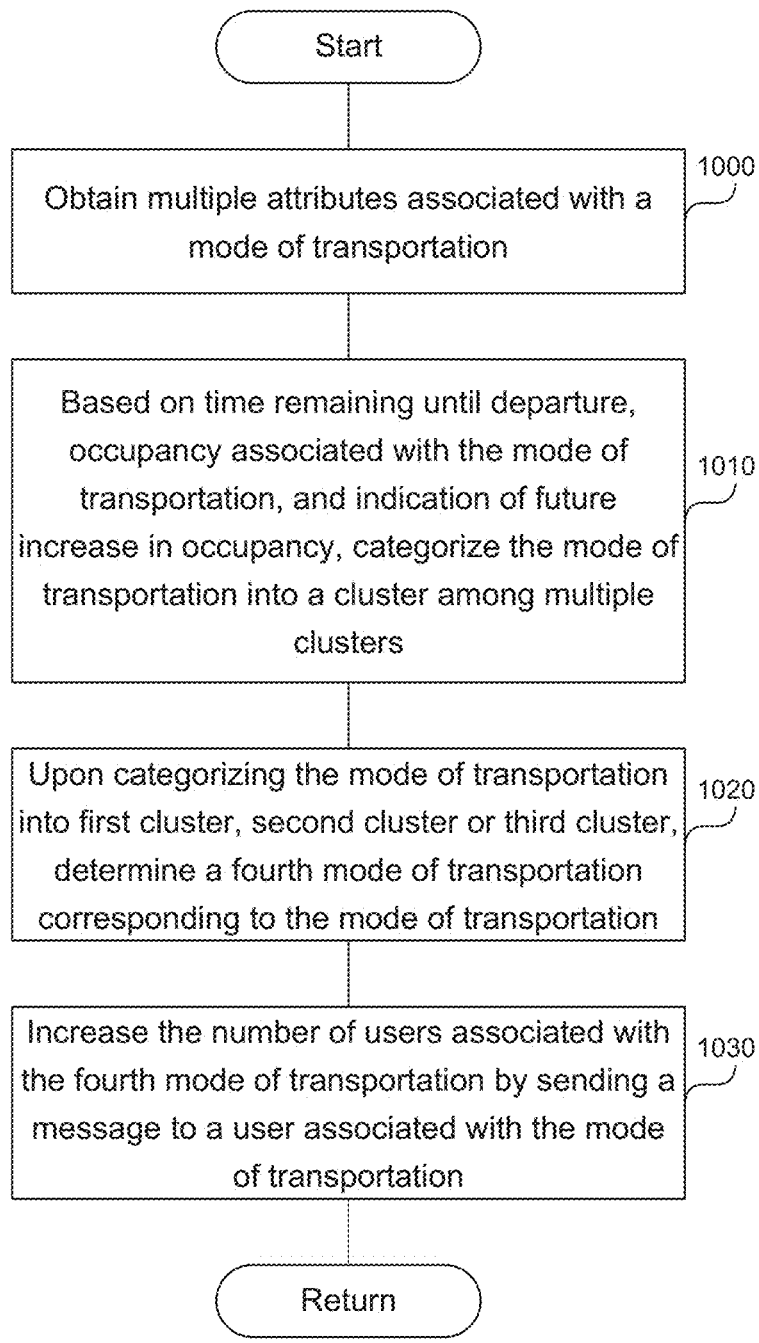
FIG. 10 is a flowchart of a method to reduce greenhouse gas emissions per passenger associated with a transportation by increasing the number of passengers associated with the transportation.

FIG. 10 is a flowchart of a method to reduce greenhouse gas emissions per passenger associated with a transportation by increasing the number of passengers associated with the transportation. In addition, the method reduces the processor cycles needed to increase the number of passengers associated with the transportation, such as a flight, by reducing the computation from an exponential computation to a computation of the order of O(N log N). A hardware or software processor executing instructions described in this application can, in step 1000, obtain multiple attributes associated with a transportation. The transportation can be a flight, train ride, bus ride, a car ride, boat ride, etc. The multiple attributes can include a time remaining until departure, occupancy associated with the transportation, time and date of departure, and an indication of future increase in occupancy. Time remaining until departure is number of days out, occupancy is load factor or percentage of seats occupied on the transportation, while the indication of future increase in occupancy can be the reference curve, e.g., 400, 500, 600, 700 in FIGS. 5-7, respectively.

In step 1010, based on the time remaining until departure, the occupancy associated with the transportation, and the indication of future increase in occupancy, the processor can categorize the transportation into a cluster among multiple clusters. A first transportation belonging to a first cluster among the multiple clusters is expected to have a number of users exceeding a number of seats associated with the transportation. A second transportation belonging to a second cluster among the multiple clusters is expected to have the number of users match the number of seats associated with the transportation. A third transportation belonging to a third cluster among the multiple clusters is likely to have the number of users exceed the number of seats associated with the transportation. In other words, the third mode of transportation has lower probability to have more users than seats, compared to the first and second transportation. A fourth transportation belonging to a fourth cluster among the multiple clusters is expected to have the number of users be less than the number of seats associated with the transportation.

In step 1020, upon categorizing the transportation into the first cluster, the second cluster, or the third cluster, the processor determines the fourth transportation corresponding to the transportation. The fourth departure location of the fourth transportation matches the departure location associated with the original transportation, and the fourth destination location matches the destination location associated with the original transportation.

In step 1030, the processor can increase the number of users associated with the fourth transportation by sending a message to a user associated with the transportation, where the message includes a request to move the user to the fourth transportation.

To determine the user associated with the transportation to whom to send the message, the system can obtain multiple attributes associated with the user, where the multiple attributes include the number of users traveling with the user, whether the user has luggage, a distance between the departure location and a home location associated with the user, a frequency of going to the destination location associated with the user, and/or an indication of an event occurring at the destination location. Based on the multiple attributes, the system can determine an indication of probability that the user moves to the fourth transportation by performing the following 3 steps. First, upon determining that the number of users traveling with the user is low and that the user does not have luggage, the system can decrease the indication of probability that the user moves to the fourth transportation. Second, upon determining that the distance between the departure location and the home location associated with the user is above a first predetermined threshold, such as 5 miles, the system can decrease the indication of probability the user moves to the fourth transportation. Third, upon determining that the frequency of going to the destination location associated with the user is above a second predetermined threshold, such as less than once a year, and that the event occurring at the destination location is occurring during the user's stay at the destination location, the system can increase the indication of probability the user moves to the fourth transportation. The system can determine whether the indication of probability the user moves to the fourth transportation is above a third predetermined threshold, such as 0.4. Upon determining that the indication of probability the user moves to the fourth transportation is above the third predetermined threshold, the system can send the message to the user associated with the transportation.

The system can use AI to predict the probability that the user moves to the fourth transportation. Specifically, the system can obtain multiple attributes associated with the user, where the multiple attributes include the number of users traveling with the user, whether the user has luggage, a distance between the departure location and a home location associated with the user, a ticket type, a frequency of going to the destination location associated with the user, or an indication of an event occurring at the destination location. The system can provide the multiple attributes to an artificial intelligence (AI) configured to determine an indication of probability that the user moves to the fourth transportation. The system can obtain from the AI the indication of probability that the user moves to the fourth transportation. Based on the indication of probability, the system can determine whether to send the message to the user associated with the transportation.

The system can determine to how many users to send the message, based on the cluster to which the transportation belongs. Specifically, the system can obtain a cluster to which the transportation belongs, where the cluster is the first cluster, the second cluster, or the third cluster. Based on whether the cluster is the first cluster, the second cluster, or the third cluster, the system can determine a second number of users to whom to send a second message including a request to move to the fourth transportation. In other words, the system moves excessive users from the flights categorized in the first, second, or third cluster to the flight in a fourth cluster. When the cluster is the first cluster, the second number of users is greater than when the cluster is the second cluster, and when the cluster is the second cluster, the second number of users is greater than when the cluster is the third cluster. In other words, the system can send most messages to users on a flight in the first cluster, fewer messages to users on a flight in the second cluster, and fewest messages to the flight in the third cluster.

The system can obtain the time remaining until departure and occupancy associated with the transportation. Based on the time remaining until departure and occupancy associated with the transportation, the system can determine a second number of users to whom to send a second message including a request to move to the fourth transportation.

The system can tokenize a first ticket associated with the user into a first non-fungible token (digital ticket), where the first digital ticket uniquely identifies the transportation and the user. The system can tokenize a second ticket associated with the fourth transportation into a second digital ticket, where the second digital ticket uniquely identifies the fourth transportation. The system can associate the first digital ticket with a digital wallet of the user and receive an acceptance of the request from the user. Upon receiving the acceptance of the request from the user, the system can track a change of the first digital ticket and the second digital ticket by: recording the change in a blockchain, removing the association between the first digital ticket and the digital wallet of the user, and adding an association between the second digital ticket and the digital wallet with the user.

To obtain the indication of future increase in occupancy the system can obtain historical data associated with multiple transportations similar to the transportation, where a fifth transportation among the multiple transportations has a matching destination location and a matching departure location as the transportation, and where a time of year associated with the fifth transportation matches a time of year associated with the transportation, and where historical data includes occupancy associated with the fifth transportation over time prior to departure of the fifth transportation. Time of year can indicate holidays, and peak seasons such as summer and winter. Based on the occupancy associated with the fifth transportation over time prior to departure of the fifth transportation, the system can determine the indication of future increase in occupancy associated with the transportation.

Computer System

Figure 11:
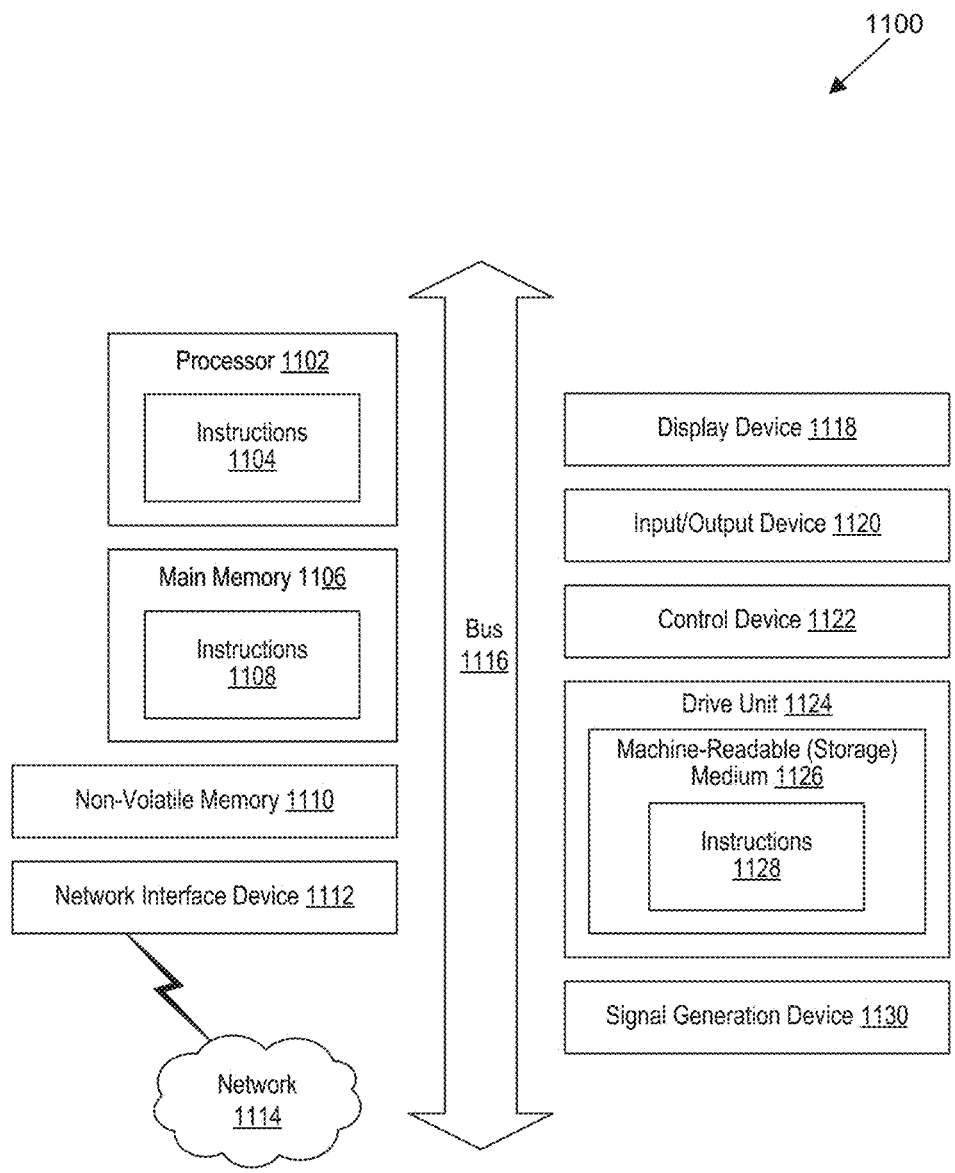
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, a video display device 1118, an input/output device 1120, a control device 1122 (e.g., keyboard and pointing device), a drive unit 1124 that includes a machine-readable (storage) medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the Figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementations, the computer system 1100 can be an embedded computer system, a system-on-chip (SOC), a single-board computer system (SBC), or a distributed system such as a mesh of computer systems, or it can include one or more cloud components in one or more networks. Where appropriate, one or more computer systems 1100 can perform operations in real time, in near real time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A system to increase efficiency of computation by reducing processing cycles needed to increase number of users on a flight comprising:
   at least one hardware processor; and
   at least one non-transitory memory storing instructions, which, when executed by the at least one hardware processor, cause the system to:
   obtain multiple attributes associated with the flight,
      wherein the multiple attributes include a time remaining until departure,
         occupancy associated with the flight, an indication of future increase in occupancy, a departure location and a destination location;
      based on the time remaining until departure, the occupancy associated with the flight, and the indication of future increase in occupancy, categorize the flight into a cluster among multiple clusters, wherein a first flight belonging to a first cluster among the multiple clusters is expected to have a number of passengers exceed a number of seats associated with the flight, wherein a second flight belonging to a second cluster among the multiple clusters is expected to have the number of passengers match the number of seats associated with the flight, wherein a third flight belonging to a third cluster among the multiple clusters is likely to have the number of passengers exceed the number of seats associated with the flight, and wherein a fourth flight belonging to a fourth cluster among the multiple clusters is expected to have the number of passengers be less than the number of seats associated with the flight;

upon categorizing the flight into the first cluster, the second cluster, or the third cluster, determine the fourth flight having a fourth departure location and a fourth destination location, wherein the fourth departure location matches the departure location associated with the flight, and the fourth destination location matches the destination location associated with the flight;

obtain multiple attributes associated with a passenger,
wherein the multiple attributes include the number of passengers traveling with the passenger, whether the passenger has luggage, a distance between the departure location and a home location associated with the passenger, ticket type, a frequency of flying to the destination location associated with the passenger, and an indication of an event occurring at the destination location; and provide the multiple attributes associated with the passenger to an artificial intelligence (AI) configured to determine an indication of probability that the passenger moves to the fourth flight;

obtain from the AI the indication of probability that the passenger moves to the fourth flight; and based on the indication of probability, determine whether to send a message to the passenger associated with the flight;

upon determining to send the message to the passenger associated with the flight, reduce greenhouse gas emissions per passenger associated with the fourth flight by increasing the number of passengers associated with the fourth flight by sending the message to the passenger associated with the flight, wherein the message includes a request to move the passenger to the fourth flight;

tokenize a first ticket associated with the passenger into a first digital ticket, wherein the first digital ticket uniquely identifies the flight and the passenger;

tokenize a second ticket associated with the fourth flight into a second digital ticket, wherein the second digital ticket uniquely identifies the fourth flight;

associate the first digital ticket with a digital wallet of the passenger;

receive an acceptance of the request from the passenger;

upon receiving the acceptance of the request from the passenger, track a change of the first digital ticket and the second digital ticket by:

recording the change in a blockchain;

removing an association between the first digital ticket and the digital wallet of the passenger; and adding an association between the second digital ticket and the digital wallet with the passenger.

2. The system of claim 1, wherein instructions to determine the passenger associated with the flight to whom to send the message comprise instructions to:

obtain multiple attributes associated with the passenger,
wherein the multiple attributes include the number of passengers traveling with the passenger, whether the passenger has luggage, a distance between the departure location and a home location associated with the passenger, a frequency of flying to the destination location associated with the passenger, and an indication of an event occurring at the destination location; and based on the multiple attributes, determine an indication of probability that the passenger moves to the fourth flight by:

upon determining that the number of passengers traveling with the passenger is low and that the passenger does not have luggage, decreasing the indication of probability that the passenger moves to the fourth flight;

upon determining that the distance between the departure location and the home location associated with the passenger is above a first predetermined threshold, decreasing the indication of probability the passenger moves to the fourth flight;

upon determining that the frequency of flying to the destination location associated with the passenger is above a second predetermined threshold, and that the event occurring at the destination location is occurring during the passenger's stay at the destination location, increasing the indication of probability the passenger moves to the fourth flight;

determine whether the indication of probability the passenger moves to the fourth flight is above a third predetermined threshold; and upon determining that the indication of probability the passenger moves to the fourth flight is above the third predetermined threshold, send the message to the passenger associated with the flight.

3. The system of claim 1, comprising instructions to:
obtain a cluster to which the flight belongs,
wherein the cluster is the first cluster, the second cluster, or the third cluster; and based on whether the cluster is the first cluster, the second cluster, or the third cluster, determine a second number of passengers to whom to send a second message including a second request to move to the fourth flight, wherein when the cluster is the first cluster, the second number of passengers is greater than when the cluster is the second cluster, and wherein when the cluster is the second cluster, the second number of passengers is greater than when the cluster is the third cluster.

4. The system of claim 1, comprising instructions to:
obtain the time remaining until departure and the occupancy associated with the flight; and based on the time remaining until departure and the occupancy associated with the flight, determine a second number of passengers to whom to send a second message including a second request to move to the fourth flight.

5. The system of claim 1, wherein instructions to obtain the indication of future increase in occupancy comprise instructions to:

obtain historical data associated with multiple flights similar to the flight,
  wherein a fifth flight among the multiple flights has a matching destination location and a matching departure location as the flight, and
  wherein a time of year associated with the fifth flight matches a time of year associated with the flight,
  wherein the historical data includes occupancy associated with the fifth flight over time prior to departure of the fifth flight; and
based on the occupancy associated with the fifth flight over time prior to departure of the fifth flight, determine the indication of future increase in occupancy associated with the flight.

6. A method comprising:
obtaining multiple attributes associated with a transportation,
  wherein the multiple attributes include a time remaining until departure, occupancy associated with the transportation, and an indication of future increase in occupancy;
based on the time remaining until departure, the occupancy associated with the transportation, and the indication of future increase in occupancy, categorizing the transportation into a cluster among multiple clusters,
  wherein a first transportation belonging to a first cluster among the multiple clusters is expected to have a number of users exceed a number of seats associated with the transportation,
  wherein a second transportation belonging to a second cluster among the multiple clusters is expected to have the number of users match the number of seats associated with the transportation,
  wherein a third transportation belonging to a third cluster among the multiple clusters is likely to have the number of users exceed the number of seats associated with the transportation, and
  wherein a fourth transportation belonging to a fourth cluster among the multiple clusters is expected to have the number of users be less than the number of seats associated with the transportation;
upon categorizing the transportation into the first cluster, the second cluster or the third cluster, determining the fourth transportation corresponding to the transportation; and
obtaining multiple attributes associated with a user,
  wherein the multiple attributes associated with the user include the number of users traveling with the user, whether the user has luggage, a distance between a departure location associated with the transportation and a home location associated with the user, a ticket type, a frequency of the user going to a destination location associated with the transportation, or an indication of an event occurring at the destination location; and
providing the multiple attributes associated with the user to an artificial intelligence (AI) configured to determine an indication of probability that the user moves to the fourth transportation;
obtaining from the AI the indication of probability that the user moves to the fourth transportation;
based on the indication of probability, determining whether to send a message to the user associated with the transportation; and
upon determining to send the message to the user associated with the transportation, increasing the number of users associated with the fourth transportation by sending the message to the user associated with the transportation,
  wherein the message includes a request to move the user to the fourth transportation.

7. The method of claim 6, wherein determining the user associated with the transportation to whom to send the message comprises:
obtaining multiple attributes associated with the user,
  wherein the multiple attributes include the number of users traveling with the user, whether the user has luggage, a distance between a departure location associated with the transportation and a home location associated with the user, a frequency of the user going to a destination location associated with the transportation, or an indication of an event occurring at the destination location; and
based on the multiple attributes, determining an indication of probability that the user moves to the fourth transportation by:
  upon determining that the number of users traveling with the user is low and that the user does not have luggage, decreasing the indication of probability that the user moves to the fourth transportation;
  upon determining that the distance between the departure location and the home location associated with the user is above a first predetermined threshold, decreasing the indication of probability the user moves to the fourth transportation;
  upon determining that the frequency of going to the destination location associated with the user is above a second predetermined threshold, and that the event occurring at the destination location is occurring during the user's stay at the destination location, increasing the indication of probability the user moves to the fourth transportation;
determining whether the indication of probability the user moves to the fourth transportation is above a third predetermined threshold; and
upon determining that the indication of probability the user moves to the fourth transportation is above the third predetermined threshold, sending the message to the user associated with the transportation.

8. The method of claim 6, comprising:
obtaining a cluster to which the transportation belongs,
  wherein the cluster is the first cluster, the second cluster or the third cluster; and
based on whether the cluster is the first cluster, the second cluster or the third cluster, determining a second number of users to whom to send a second message including a second request to move to the fourth transportation,
  wherein when the cluster is the first cluster, the second number of users is greater than when the cluster is the second cluster, and
  wherein when the cluster is the second cluster, the second number of users is greater than when the cluster is the third cluster.

9. The method of claim 6, wherein obtaining the indication of future increase in occupancy comprises:
obtaining historical data associated with multiple transportations similar to the transportation,
  wherein a fifth transportation among the multiple transportations has a matching destination location and a matching departure location as the transportation, and wherein a time of year associated with the fifth transportation matches a time of year associated with the transportation, wherein the historical data includes occupancy associated with the fifth transportation over time prior to departure of the fifth transportation; and based on the occupancy associated with the fifth transportation over time prior to departure of the fifth transportation, determining the indication of future increase in occupancy associated with the transportation.

10. A non-transitory, computer-readable storage medium comprising instructions recorded there on, wherein the instructions when executed by at least one data processor of a system, cause the system to:

obtain multiple attributes associated with a transportation,
wherein the multiple attributes include a time remaining until departure, occupancy associated with the transportation, and an indication of future increase in occupancy;

based on the time remaining until departure, the occupancy associated with the transportation, and the indication of future increase in occupancy, categorize the transportation into a cluster among multiple clusters,
wherein a first transportation belonging to a first cluster among the multiple clusters is expected to have a number of users exceeding a number of seats associated with the transportation,
wherein a second transportation belonging to a second cluster among the multiple clusters is expected to have the number of users match the number of seats associated with the transportation,
wherein a third transportation belonging to a third cluster among the multiple clusters is likely to have the number of users exceed the number of seats associated with the transportation, and
wherein a fourth transportation belonging to a fourth cluster among the multiple clusters is expected to have the number of users be less than the number of seats associated with the transportation;

upon categorizing the transportation into the first cluster, the second cluster or the third cluster, determine the fourth transportation corresponding to the transportation;

obtain multiple attributes associated with a user,
wherein the multiple attributes associated with the user include the number of users traveling with the user, whether the user has luggage, a distance between a departure location associated with the transportation and a home location associated with the user, a ticket type, a frequency of the user going to a destination location associated with the transportation, or an indication of an event occurring at the destination location; and provide the multiple attributes associated with the user to an artificial intelligence (AI) configured to determine an indication of probability that the user moves to the fourth transportation;

obtain from the AI the indication of probability that the user moves to the fourth transportation;

based on the indication of probability, determine whether to send a message to the user associated with the transportation; and upon determining to send the message to the user associated with the transportation, increase the number of users associated with the fourth transportation by sending the message to the user associated with the transportation,
wherein the message includes a request to move the user to the fourth transportation.

11. The non-transitory, computer-readable storage medium of claim 10, wherein instructions to determine the user associated with the transportation to whom to send the message comprise instructions to:

obtain multiple attributes associated with the user,
wherein the multiple attributes include the number of users traveling with the user, whether the user has luggage, a distance between a departure location associated with the transportation and a home location associated with the user, a frequency of the user of going to a destination location associated with the transportation, or an indication of an event occurring at the destination location; and based on the multiple attributes, determine an indication of probability that the user moves to the fourth transportation by:
upon determining that the number of users traveling with the user is low and that the user does not have luggage, decreasing the indication of probability that the user moves to the fourth transportation;
upon determining that the distance between the departure location and the home location associated with the user is above a first predetermined threshold, decreasing the indication of probability the user moves to the fourth transportation;
upon determining that the frequency of going to the destination location associated with the user is above a second predetermined threshold, and that the event occurring at the destination location is occurring during the user's stay at the destination location, increasing the indication of probability the user moves to the fourth transportation;

determine whether the indication of probability the user moves to the fourth transportation is above a third predetermined threshold; and upon determining that the indication of probability the user moves to the fourth transportation is above the third predetermined threshold, send the message to the user associated with the transportation.

12. The non-transitory, computer-readable storage medium of claim 10, comprising instructions to:

obtain a cluster to which the transportation belongs,
wherein the cluster is the first cluster, the second cluster or the third cluster; and based on whether the cluster is the first cluster, the second cluster or the third cluster, determine a second number of users to whom to send a second message including a request to move to the fourth transportation,
wherein when the cluster is the first cluster, the second number of users is greater than when the clusters cluster is the second cluster, and
wherein when the cluster is the second cluster, the second number of users is greater than when the cluster is the third cluster.

13. The non-transitory, computer-readable storage medium of claim 10, comprising instructions to:

obtain the time remaining until departure and occupancy associated with the transportation; and based on the time remaining until departure and occupancy associated with the transportation, determine a second number of users to whom to send a second message including a request to move to the fourth transportation.

14. The non-transitory, computer-readable storage medium of claim 10, wherein instructions to obtain the indication of future increase in occupancy comprise instructions to:
- obtain historical data associated with multiple transportations similar to the transportation,
  - wherein a fifth transportation among the multiple transportations has a matching destination location and a matching departure location as the transportation, and
  - wherein a time of year associated with the fifth transportation matches a time of year associated with the transportation,
  - wherein historical data includes occupancy associated with the fifth transportation over time prior to departure of the fifth transportation; and
- based on the occupancy associated with the fifth transportation over time prior to departure of the fifth transportation, determine the indication of future increase in occupancy associated with the transportation.

* * * * *